(12) United States Patent
Neil et al.

(10) Patent No.: US 6,986,585 B1
(45) Date of Patent: Jan. 17, 2006

(54) RADIUS OF CURVATURE CONTROLLED MIRROR

(75) Inventors: George R. Neil, Williamsburg, VA (US); John Wickham Rathke, Centerport, NY (US); Thomas John Schultheiss, Commack, NY (US); Michelle D. Shinn, Newport News, VA (US); Lawrence A. Dillon-Townes, Newport News, VA (US)

(73) Assignee: Southeastern Univ. Research Assm, Newport News, VA (US)

( * ) Notice: Subject to any disclaimer, the term of this patent is extended or adjusted under 35 U.S.C. 154(b) by 0 days.

(21) Appl. No.: 10/978,887

(22) Filed: Nov. 1, 2004

(51) Int. Cl.
*G02B 5/08* (2006.01)

(52) U.S. Cl. ...................................... 359/845; 359/224

(58) Field of Classification Search ........ 359/223–226, 359/290–292, 838, 845, 846, 868, 871, 882, 359/883
See application file for complete search history.

(56) References Cited

U.S. PATENT DOCUMENTS 5,889,256 A * 3/1999 Osanai ....................... 359/846
5,963,374 A * 10/1999 Endou et al. ............... 359/641

* cited by examiner

*Primary Examiner*—Euncha P. Cherry

(57) ABSTRACT

A controlled radius of curvature mirror assembly comprising: a distortable mirror having a reflective surface and a rear surface; and in descending order from the rear surface; a counter-distortion plate; a flow diverter having a flow diverter aperture at the center thereof; a flow return plate having a flow return aperture at the center thereof; a thermal isolation plate having a thermal isolation plate aperture at the center thereof and a flexible heater having a rear surface and a flexible heater aperture at the center thereof; a double walled tube defining a coolant feed chamber and a coolant return chamber; said coolant feed chamber extending to and through the flow diverter aperture and terminating at the counter-distortion plate and the coolant return chamber extending to and through the thermal isolation backplate and terminating at the flow diverter; and a coolant feed and a coolant return exit at the rear of said flexible heater.

8 Claims, 3 Drawing Sheets

RADIUS OF CURVATURE CONTROLLED MIRROR

The United States of America may have certain rights to this invention under Management and Operating contract No. DE-AC05-84ER 40150 from the Department of Energy

FIELD OF THE INVENTION

The present invention relates to apparatus for the control of curvature in mirrors and more particularly to apparatus for the control of the radius of curvature of mirrors based upon the differential expansion of dissimilar materials.

BACKGROUND OF THE INVENTION

It is often necessary to control the radius of curvature of a mirror to control precisely the location of the focal point, for example, in the case of the use of lasers in machining operations or to compensate for changes in other optical components due to heating of the mirror or other physical changes.

Among the methods commonly used to achieve such control of the radius of curvature of a mirror is that which utilizes pressure on the rear surface of the mirror while the outer periphery thereof is held in a constant position, thus resulting in the desired corrective distortion of the mirror. Such methods include those disclosed in: U.S. Pat. No. 6,253,619 to Danyluk et al, issued Jul. 3, 2001 that describes an adjustable acoustic mirror in which the curvature is adjusted with a screw, rod or voltage modulator; U.S. Pat. No. 6,260,976 to Endou et al, issued Jul. 17, 2001 that describes a laser beam collimation device in which the collimation mirror is convex in its initial state but may be changed in its radius of curvature by a piezolectric actuator pressing from the rear side; and U.S. Pat. No. 4,295,710 to Heinz, issued Oct. 20, 1981 that describes a multi-actuator deformable mirror for correcting wavefront aberrations in a laser fusion optical system which comprises a copper-surfaced aluminum faceplate supported by a plurality of ball screw mirror actuator assemblies. In the last assembly, a copper coating is provided on the rear of the faceplate to mitigate bimetal distortion effects.

While each of these and similar prior art radius of curvature control devices provide adequate control in many applications, they are relatively complex, and often do not provide a perfectly spherical distortion of the mirror.

There is therefore, a need for a relatively simple radius of curvature control system that provides nearly spherical distortion of the mirror in response to external influences, especially heating.

OBJECT OF THE INVENTION

It is therefore an object of the present invention to provide a relatively simple to implement radius of curvature control device for cooled mirrors, which device provides nearly spherical distortion of the mirror in response to uniform heating of the backside of the mirror.

SUMMARY OF THE INVENTION

According to the present invention, there is provided a controlled radius of curvature mirror assembly comprising: a distortable mirror having a reflective surface and a rear surface; and in descending order from the rear surface; a counter-distortion plate; a flow diverter having a flow diverter aperture at the center thereof; a flow return plate having a flow return aperture at the center thereof; a thermal isolation plate having a thermal isolation plate aperture at the center thereof and a flexible heater having a rear surface and a flexible heater aperture at the center thereof; a double walled tube defining a coolant feed chamber and a coolant return chamber; said coolant feed chamber extending to and through the flow diverter aperture and terminating at the counter-distortion plate and the coolant return chamber extending to and through the thermal isolation plate and terminating at the flow diverter; and a coolant feed and a coolant return exit at the rear of said flexible heater.

DETAILED DESCRIPTION

Figure 2:
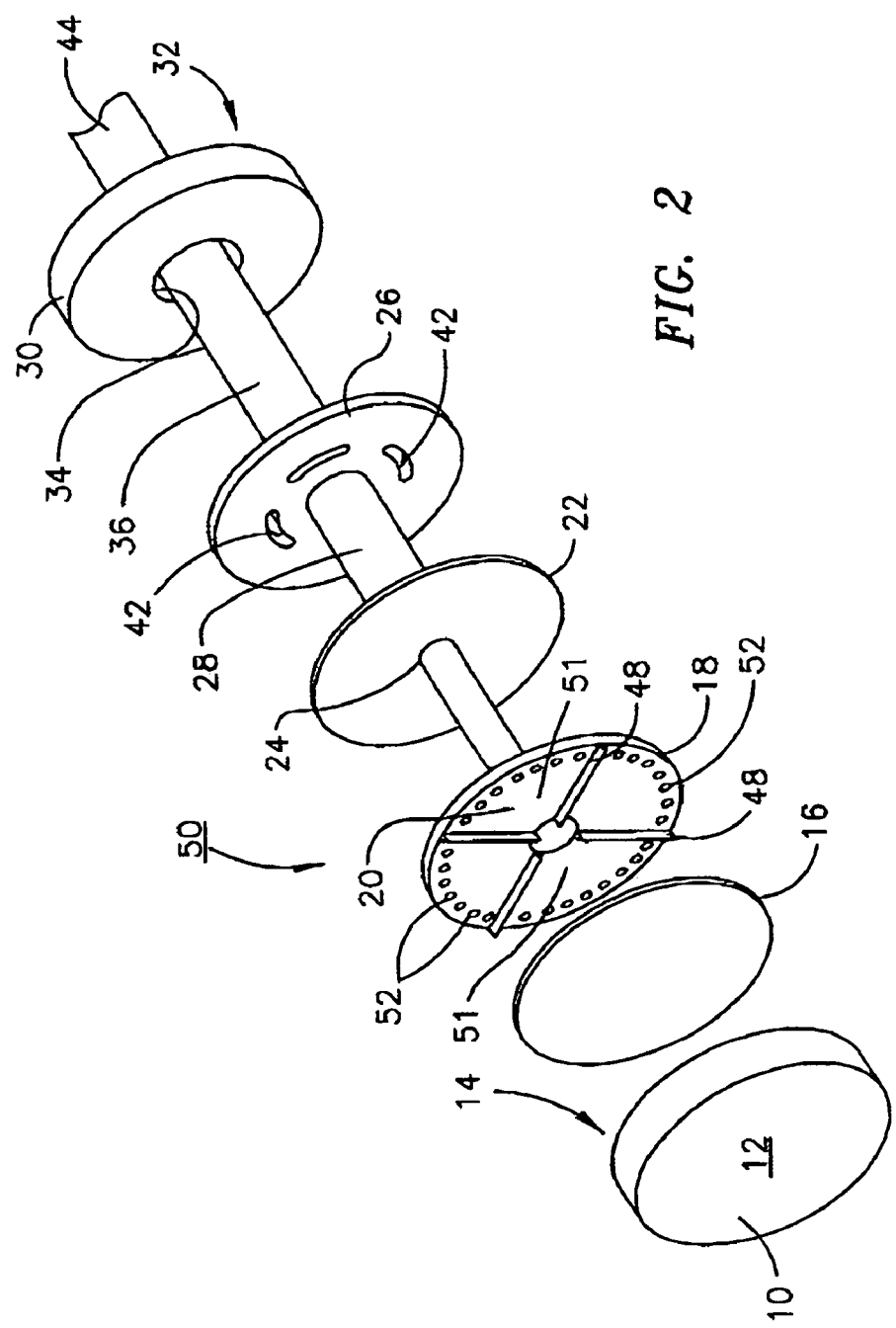
FIG. 2 is an exploded view of the controlled radius of curvature mirror assembly of the present invention.
Figure 3:
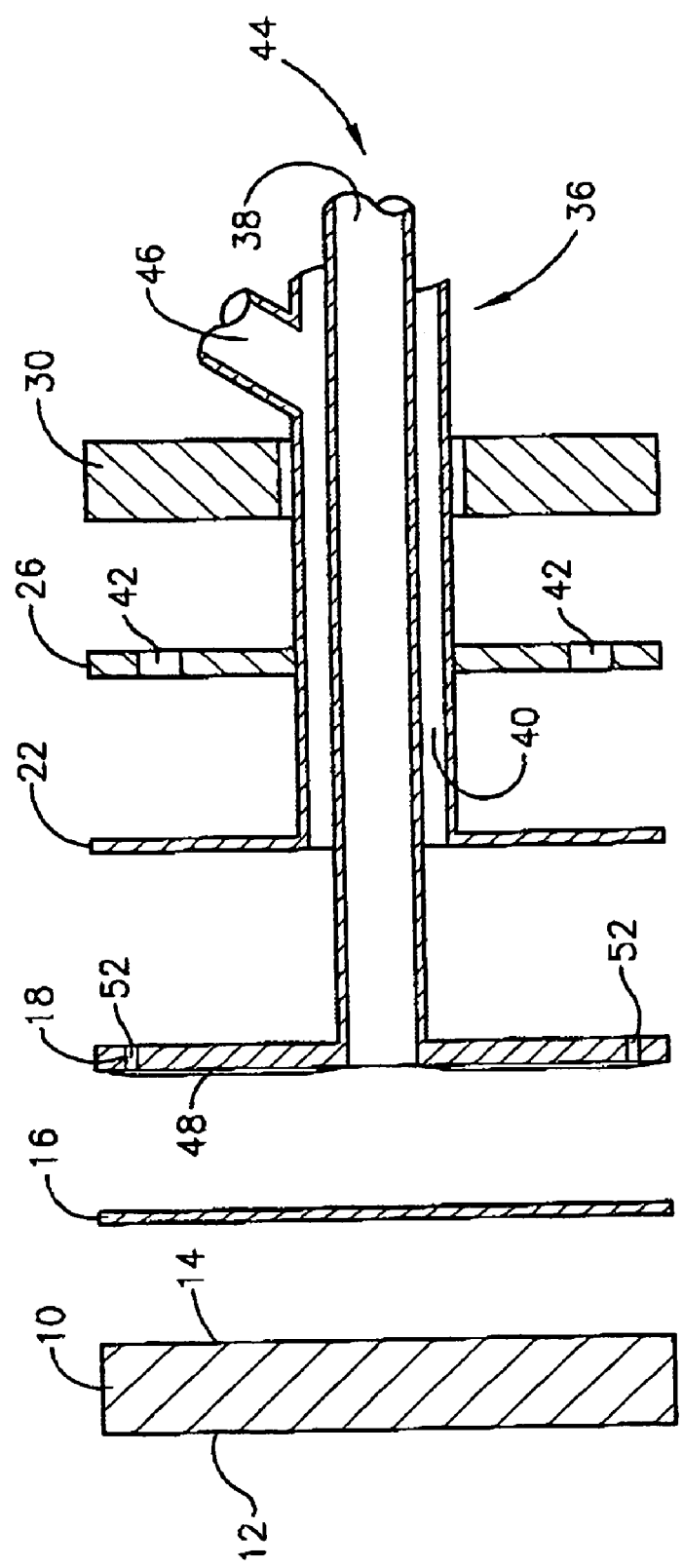
FIG. 3 is a cross-sectional view of the apparatus of the present invention.

Referring now to FIG. 2, the controlled radius of curvature mirror assembly 50 of the present invention comprises bonded in order: A) a distortable mirror 10 having a reflective surface 12 and a rear surface 14; and in descending order from rear surface 14; a counter-distortion plate 16; a flow diverter 18 having a flow diverter aperture 20 at the center thereof; a flow return plate 22 having a flow return aperture 24 at the center thereof; a thermal isolation plate 26 having a thermal isolation plate aperture 28 at the center thereof and a flexible heater 30 having a rear surface 32 and a flexible heater aperture 34 at the center thereof; a double walled tube 36 defining a coolant feed chamber 38 and a coolant return chamber 40; coolant feed chamber 38 extending to and through flow diverter plate aperture 20 and terminating at counter-distortion plate 16 and coolant return chamber 42 extending to and through thermal isolation plate 26 and terminating at flow diverter plate 18; a coolant feed 44; and a coolant return exit 46 beyond rear surface 14 of flexible heater 30. Coolant feed and coolant return chambers 38 and 42 are best seen in FIG. 3. Each of the foregoing elements is bonded to the abutting elements using a thin layer of some appropriate durable and relatively non-heat sensitive bonding agent such as an epoxy cement.

Figure 1:
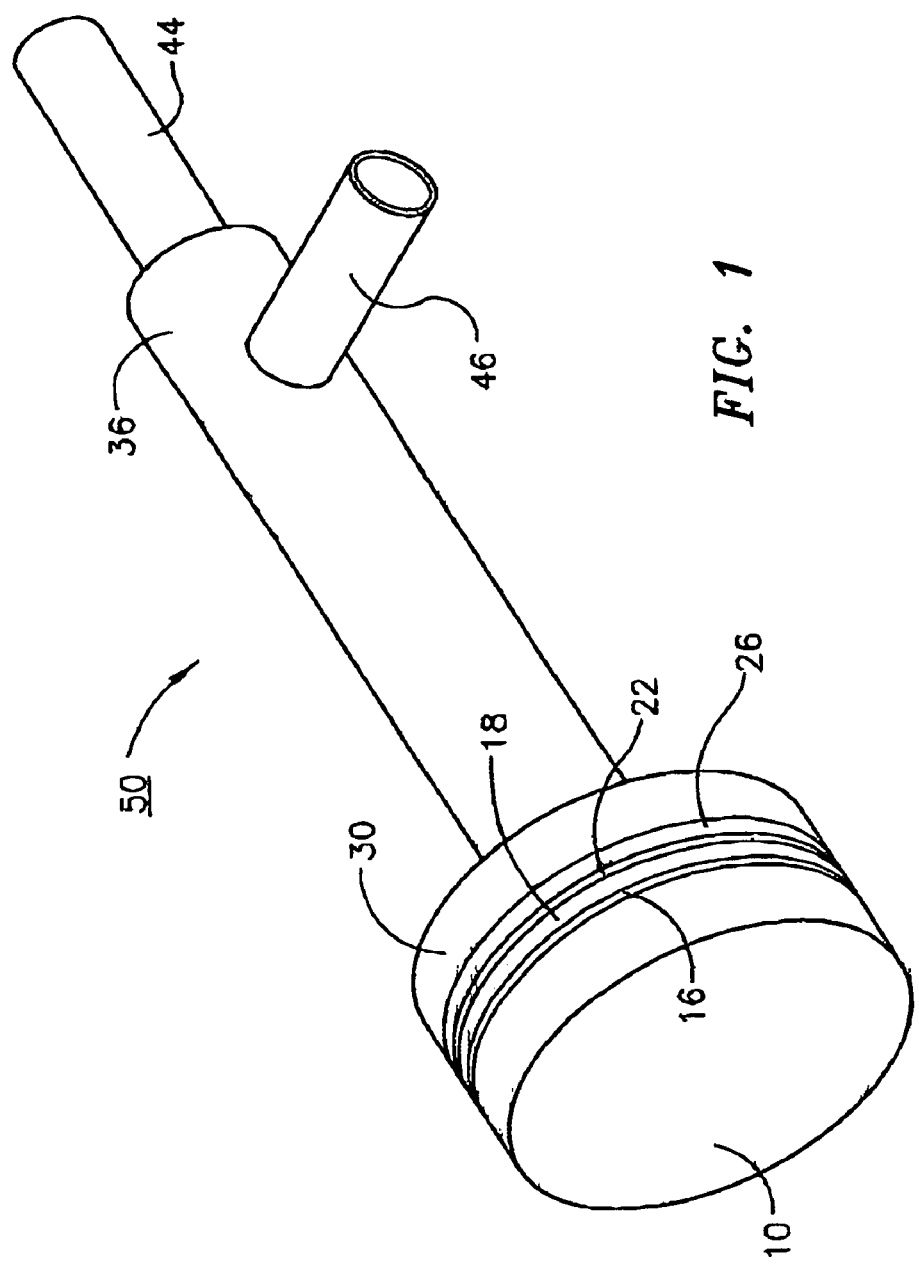
FIG. 1 depicts a perspective view of the controlled radius of curvature mirror assembly of the present invention.

FIG. 1 depicts the entire controlled curvature mirror assembly 50 of FIG. 2 in its assembled condition.

Considering now each of the elements of controlled curvature mirror assembly 50, distortable mirror 10 may comprise any of a vast number of flexible mirror materials such as silicon, counter-distortion 16 may similarly be comprised of a wide variety of materials of having a coefficient of thermal expansion dissimilar from that of distortable mirror 10, but is desirably of a metal with a relatively large coefficient of thermal expansion such as copper or aluminum, flow diverter 18 allows the ingress of coolant through coolant feed chamber 38 and disperses coolant across the surface thereof. In the embodiment depicted in FIG. 2, diagonal ribs 48 assist such dispersion of coolant by providing channels 51 that conduct coolant to apertures 52 that allow the return of coolant to flow return plate 22 through flow return plate aperture 24 that provides access to coolant return chamber 42. Thermal isolation plate 26 comprises largely void space to allow for the presence of air or some suitable cooling gas to permit thermal conduction to and thermal isolation from flexible heater 30 from the balance of the assembly.

The method of control is based upon the differential thermal expansion of dissimilar materials. The materials are bonded, one on each side to a thermally conductive counter-distortion layer that may have either cooling fluid passing through it or a source of heat added to it. In a specific example, a flexible heater 30 is attached to a thermal isolation plate 26 that is in turn bonded to a cooled counter-distortion plate (fabricated, for example from copper, aluminum, steel or the like) 16 that is in turn bonded to rear surface 14 of distortable mirror 10 (fabricated, for example from silicon). If a high power laser beam impinges on mirror 10, mirror surface 12 heats up and expands leading to a more positive (convex) radius of curvature. The heat that is deposited on surface 12 is extracted by coolant (water, as an example) passing through cooling channels 51 in flow diverter 18 attached to counter-distortion plate 16. On the contrary, if additional heat is added to rear surface 14 by, for example the resistive heating of flexible heater 30 then surface 14 also acquires a positive radius of curvature but since it is facing in the opposite direction from surface 12 it counteracts the positive curvature of surface 12.

Flow diverter 18, flow return plate 22 and thermal isolation plate 26 may all be fabricated form an appropriate heat conductive material such as steel or the like. Flexible heater elements for use as flexible heater 30 are well known in the art and commonly available.

As the invention has been described, it will be apparent to those skilled in the art that the same may be varied in many ways without departing from the spirit and scope of the invention. Any and all such modifications are intended to be included within the scope of the appended claims.

What is claimed is:

1. A controlled radius of curvature mirror assembly comprising bonded in order:
    a) a distortable mirror having a reflective surface and a rear surface; and in descending order from the rear surface;
    b) a counter-distortion plate of a material dissimilar to that of the distortable mirror;
    c) a flow diverter having a flow diverter aperture at the center thereof;
    d) a flow return plate having a flow return aperture at the center thereof;
    e) a thermal isolation plate having a thermal isolation plate aperture at the center thereof;
    f) a flexible heater having a rear surface and a flexible heater aperture at the center thereof; and
    g) a double walled tube defining a coolant feed chamber and a coolant return chamber;
    said coolant feed chamber extending from the flexible heater aperture to and through the flow diverter aperture and terminating at the counter-distortion plate and the coolant return chamber extending from the flexible heater aperture to and through the thermal isolation backplate and terminating at the flow diverter.

2. The controlled radius of curvature mirror assembly of claim 1 wherein the double walled tube further includes a coolant feed and a coolant return exit.

3. The controlled radius of curvature mirror assembly of claim 1 wherein said counter-distortion plate comprises a metal.

4. The controlled radius of curvature mirror assembly of claim 3 wherein said metal is selected from the group consisting of copper, steel and aluminum.

5. The controlled radius of curvature mirror assembly of claim 1 wherein said mirror is a silicon mirror.

6. The controlled radius of curvature mirror assembly of claim 1 wherein the flow diverter includes a mechanism for dispersing coolant over the surface thereof and a mechanism for returning dispersed coolant to the flow return plate.

7. The controlled radius of curvature mirror assembly of claim 6 wherein the diverter has a front surface proximate the mirror and the mechanism for dispersing coolant over the surface thereof comprises a series of ribs on the front surface and the mechanism for returning dispersed coolant to the flow return plate comprises apertures about the periphery of the diverter.

8. The controlled radius of curvature mirror assembly of claim 1 wherein the thermal isolation plate comprises a plate having a plurality of apertures therein for the permeation of air or another suitable insulator material.

* * * * *